United States Patent
Kurehashi et al.

(10) Patent No.: US 11,622,228 B2
(45) Date of Patent: Apr. 4, 2023

(54) INFORMATION PROCESSING APPARATUS, VEHICLE, COMPUTER-READABLE STORAGE MEDIUM, AND INFORMATION PROCESSING METHOD

(71) Applicant: HONDA MOTOR CO.,LTD., Tokyo (JP)

(72) Inventors: Takahiro Kurehashi, Saitama (JP); Shigeru Inoue, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 59 days.

(21) Appl. No.: 17/184,618

(22) Filed: Feb. 25, 2021

(65) Prior Publication Data

US 2021/0281968 A1   Sep. 9, 2021

(30) Foreign Application Priority Data

Mar. 5, 2020 (JP) .............................. JP2020-037903

(51) Int. Cl.
*H04W 4/44* (2018.01)
*H04W 4/021* (2018.01)
(Continued)

(52) U.S. Cl.
CPC ............ *H04W 4/021* (2013.01); *G06V 20/58* (2022.01); *G08G 1/091* (2013.01); *H04W 4/06* (2013.01); *H04W 4/44* (2018.02); *H04W 4/90* (2018.02)

(58) Field of Classification Search
CPC ......... H04W 4/021; H04W 4/06; H04W 4/44; H04W 4/90; G06V 20/58; G08G 1/091;
(Continued)

(56) References Cited

U.S. PATENT DOCUMENTS

2017/0018187 A1   1/2017 Kim
2018/0224846 A1   8/2018 Kovacs
(Continued)

FOREIGN PATENT DOCUMENTS

JP   2001043383 A   2/2001
JP   2018528670 A   9/2018
(Continued)

OTHER PUBLICATIONS

Office Action issued for counterpart Chinese Application 202110074826.2, issued by the China National Intellectual Property Administration dated Jul. 5, 2022.

*Primary Examiner* — Marcus Hammonds

(57) ABSTRACT

An information processing apparatus includes an image obtaining unit which obtains an image around a moving object. The information processing apparatus includes a determining unit which determines a risk area based on an image obtained by the image obtaining unit. The information processing apparatus includes a communication unit which transmits risk area information related to a risk area determined by the determining unit to an information collecting apparatus which collects information from a plurality of moving objects. The communication unit transmits risk area information to the information collecting apparatus when the moving object is within a region where information is provided by the information collecting apparatus.

10 Claims, 8 Drawing Sheets

(51) Int. Cl.
*G08G 1/09* (2006.01)
*H04W 4/90* (2018.01)
*H04W 4/06* (2009.01)
*G06V 20/58* (2022.01)

(58) Field of Classification Search
CPC .......... G08G 1/04; G08G 1/164; G08G 1/166; G16Y 10/40; G16Y 20/20; G16Y 40/10; G16Y 40/20; G16Y 40/50
See application file for complete search history.

(56) References Cited

U.S. PATENT DOCUMENTS

| | | | |
|---|---|---|---|
| 2019/0028862 A1* | 1/2019 | Futaki | H04W 4/44 |
| 2020/0084419 A1* | 3/2020 | Shimotsuma | H04N 7/183 |
| 2022/0182498 A1* | 6/2022 | Singh | G08G 1/09 |

FOREIGN PATENT DOCUMENTS

| | | |
|---|---|---|
| JP | 2019087847 A | 6/2019 |
| WO | 2017046979 A1 | 3/2017 |
| WO | 2017057055 A1 | 4/2017 |
| WO | 2019044007 A1 | 3/2019 |

\* cited by examiner

| ID | DETERMINATION SOURCE | ATTRIBUTE | RISK AREA | TIME |
|---|---|---|---|---|
| ID 1 | AUTOMOBILE | PEDESTRIAN | AREA A1 | TIME T1 |
| ID 2 | AUTOMOBILE | OUT OF VISIBILITY | AREA A2 | TIME T2 |
| ID 3 | MEC | PEDESTRIAN LINE | AREA A3 | TIME T3 |
| ... | ... | ... | ... | ... |

*FIG. 4*

INFORMATION PROCESSING APPARATUS, VEHICLE, COMPUTER-READABLE STORAGE MEDIUM, AND INFORMATION PROCESSING METHOD

CROSS REFERENCE TO RELATED APPLICATION

The contents of the following Japanese patent application are incorporated herein by reference,
Japanese Patent Application NO. 2020-037903 filed on Mar. 5, 2020.

BACKGROUND

1. Technical Field

The present invention relates to an information processing apparatus, a vehicle, a computer-readable storage medium, and an information processing method.

2. Related Art

Patent document 1 describes a step of, among vehicles running within a plurality of cells managed by an MEC server 10, determining one or more vehicles that transmit point cloud data to the MEC server 10 (S7 to S10) and requesting the transmission of the point cloud data (S11). Patent document 2 describes a step of selecting a wireless unicast mode among the plurality of wireless unicast modes based on predetermined criteria for the road-to-vehicle communication. Patent document 3 describes that an RSU 120 is placed near an intersection 110, . . . and ProSe communication is performed with the vehicle UE 100 to 102 to provide the V2I service. Patent document 4 describes a step of detecting an obstacle using a two-value image composed of object regions.

PRIOR ART DOCUMENT

Patent Document

Patent document 1: Japanese Unexamined Patent Application, Publication No. 2019-087847
Patent document 2: Japanese Translation of PCT International Patent Application No. 2018-528670
Patent document 3: WO2017/046979
Patent document 4: Japanese Unexamined Patent Application, Publication No. 2001-43383

BRIEF DESCRIPTION OF THE DRAWINGS

FIG. 3 is a schematic flow of a process performed by the vehicle 20, an MEC server 60, and a terminal 82a.
FIG. 4 is one example of risk area information managed by the MEC server 60.

DESCRIPTION OF EXEMPLARY EMBODIMENTS

Hereinafter, the invention will be described through embodiments of the present invention, but the following embodiments do not limit the invention according to claims. Further, not all of the combinations of features described in the embodiments are essential for means to solve the problem in the invention.

Figure 1:
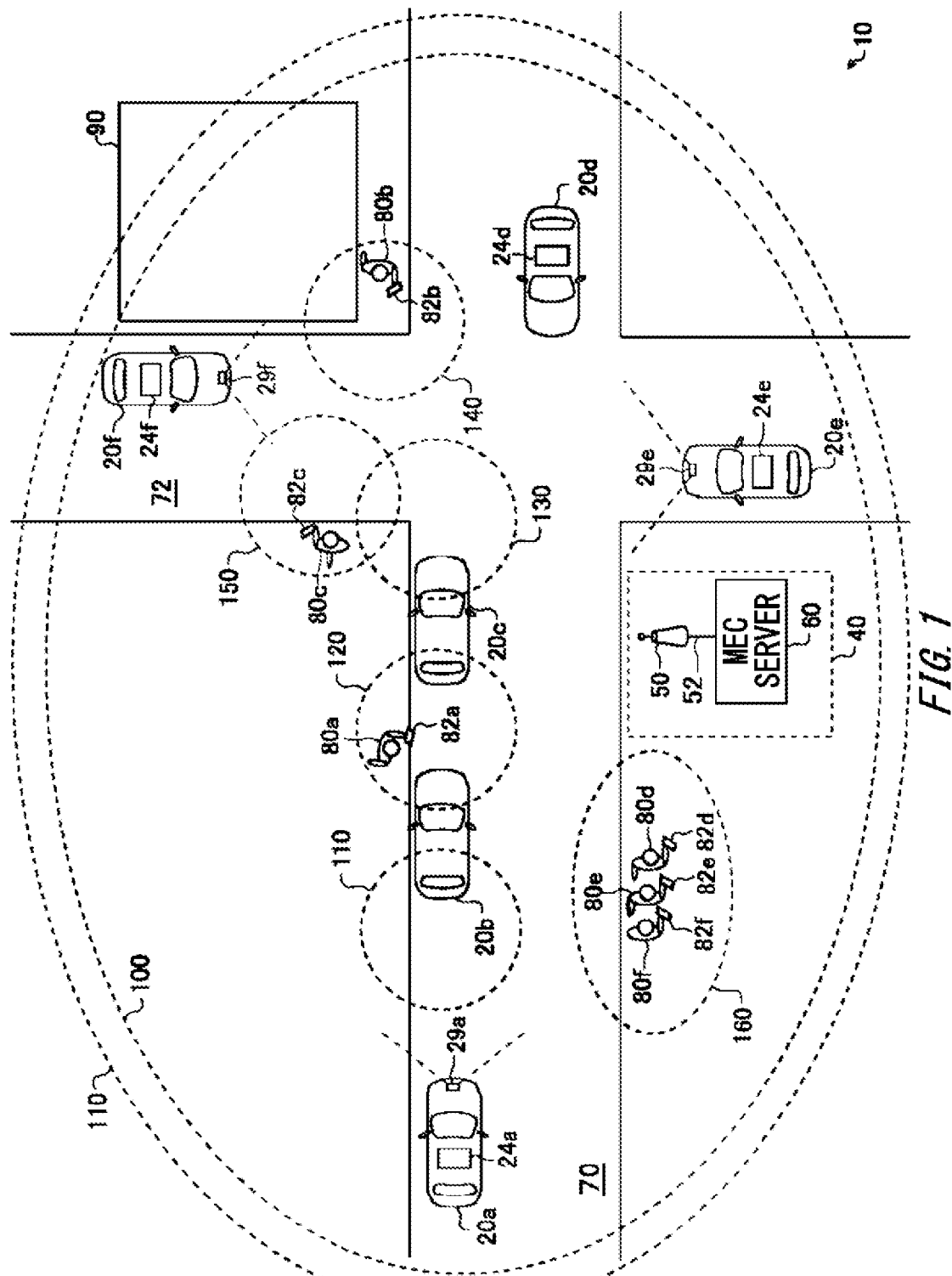
FIG. 1 is a schematic view of a warning system 10.

FIG. 1 is a schematic view for a use case of a warning system 10. The warning system 10 includes a vehicle 20a, a vehicle 20b, a vehicle 20c, a vehicle 20d, a vehicle 20e, and a vehicle 20f, a terminal 82a, a terminal 82b, a terminal 82c, a terminal 82d, a terminal 82e, and a terminal 82f, and an information collecting apparatus 40.

In the present embodiment, the vehicle 20a, the vehicle 20b, the vehicle 20c, the vehicle 20d, the vehicle 20e, and the vehicle 20f may be collectively referred to as the vehicle 20. The vehicle 20 is one example of a moving object. In addition, the terminal 82a, the terminal 82b, the terminal 82c, the terminal 82d, the terminal 82e, and the terminal 82f are the terminals possessed by a pedestrian 80a, a pedestrian 80b, a pedestrian 80c, a pedestrian 80d, a pedestrian 80e, and a pedestrian 80f, respectively. In the present embodiment, the pedestrian 80a, the pedestrian 80b, the pedestrian 80c, the pedestrian 80d, the pedestrian 80e, and the pedestrian 80f may be collectively referred to as a pedestrian 80. In addition, the terminal 82a, the terminal 82b, the terminal 82c, the terminal 82d, the terminal 82e, and the terminal 82f may be collectively referred to as a terminal 82.

The vehicle 20 includes a sensor 29 and an information processing apparatus 24. The sensor 29 is configured to include a camera. The information processing apparatus 24 includes a processing function for information obtained by the sensor 29 and a communication function. It is noted that, in the present embodiment, the suffix of the reference symbol of the vehicle 20, that is, any of "a" to "f" is added to the suffix of the reference symbol of components included in the vehicle 20 (for example, the sensor 29 and the information processing apparatus 24) to indicate which of the vehicle 20 includes the component. It is noted that in the present embodiment the vehicle 20d is supposed to include no sensors.

The information collecting apparatus 40 is provided near an intersection. For example, the information collecting apparatus 40 is provided on a traffic light or at a road shoulder. The information collecting apparatus 40 can perform wireless communication directly with a communication terminal that is present in a communication area 110. The information collecting apparatus 40 provides a service by performing wireless communication directly with a communication terminal that is present in a predetermined information provision area 100 including an intersection within the communication area 110.

The information collecting apparatus 40 includes a wireless access apparatus 50 and the MEC server 60. The wireless access apparatus 50 is located on the edge of the mobile communication network. For example, the wireless access apparatus 50 is a RAN node. The wireless access apparatus 50 covers a relatively small communication area. The wireless access apparatus 50 may be a small cell. The wireless access apparatus 50 is connected to the core network of the mobile communication network. It is noted that the wireless access apparatus 50 may be provided near the intersection and the MEC server 60 may be provided in a location far from the intersection.

The MEC server 60 is a mobile edge computing (MEC) server. For example, the MEC server 60 is connected between the core facility of the mobile communication network and the wireless access apparatus 50. The MEC server 60 may be connected to the wireless access apparatus 50 via a dedicated line 52. The MEC server 60 provides a service by performing wireless communication with a communication terminal that is present in the information provision area 100 via the wireless access apparatus 50. The MEC is one example of the processing unit connected to the wireless access apparatus 50.

The vehicle 20 transmits risk area information to the MEC server 60 when it enters the information provision area 100. In the present embodiment, the risk area is, for example, an area that poses a risk for the pedestrian 80 or the vehicle 20. For example, the risk area is an area where the pedestrian 80 or the vehicle 20 needs to perform a safety check.

In FIG. 1, the vehicle 20a and the vehicle 20d are vehicles running along a road 70, and the vehicle 20b and the vehicle 20c are the vehicles parked on the road 70. An area 120 between the vehicle 20b and the vehicle 20c that are parked is an area that is difficult to be seen from the location of the vehicle 20a and the location of the vehicle 20d. Therefore, the information processing apparatus 24a and the information processing apparatus 24d determine that the area 120 is an area with a poor visibility for the vehicle 20, and determine it as a risk area. Then, the information processing apparatus 24a and the information processing apparatus 24d transmit the risk area information including the location information of the area 120 to the MEC server 60.

In addition, the area 110 that is adjacent to the vehicle 20b and is toward the vehicle 20a is an area that is difficult to be seen for the vehicle 20d running along the lane on the opposite side to the vehicle 20a. Therefore, the information processing apparatus 24a determines that the area 110 is an area with a poor visibility for the vehicle 20, determines it as a risk area, and transmits the risk area information including the location information of the area 110 to the MEC server 60. Similarly, the area 130 which is adjacent to the vehicle 20c and toward the vehicle 20d is an area that is difficult to be seen for the vehicle 20a. Therefore, the information processing apparatus 24d determines the area 130 as a risk area and transmits the risk area information including the location information of the area 130 to the MEC server 60. In addition, for example, the building 90 prevents the area 140 from being seen from the location of the vehicle 20f running along the road 72. Therefore, the information processing apparatus 24e of the vehicle 20e determines the area 140 including the location in which the pedestrian 80b is present as a risk area and transmits risk area information including the location information of the area 140 to the MEC server 60. Thus, the information processing apparatus 24 determines an area which is the blind spot for the own vehicle or another vehicle as a risk area and transmits the risk area information to the MEC server 60.

In addition, when detecting the pedestrian 80c who is walking toward the road, the information processing apparatus 24e of the vehicle 20e determines the area 150 including the place to which the pedestrian 80c is advancing as a risk area and transmits the risk area information including the location information of the area 150 to the MEC server 60.

In addition, when detecting the pedestrian 80d, the pedestrian 80e, and the pedestrian 80f who are walking in line and determining that at least one of the pedestrians 80 is a child, the information processing apparatus 24a of the vehicle 20a determines the area 160 including the pedestrian 80d, the pedestrian 80e, and the pedestrian 80f as a risk area and transmits the risk area information to the MEC server 60.

The MEC server 60 may determine a risk area based on current location information of the terminal 82 or attribute data associated with the terminal 82, independently from the risk area information transmitted by the vehicle 20. For example, the MEC server 60 may determine the area 140 including the location of the terminal 82b which is present near the building 90 as a risk area. In addition, the MEC server 60 may determine the area 150 including the location of the terminal 82c moving toward the roadway and the area 140 including the location of the terminal 82b moving toward the roadway as risk areas. When determining, based on the location information of the terminal 82d, the terminal 82e, and the terminal 82f, that the terminal 82d, the terminal 82e, and the terminal 82f is moving in line, the MEC server 60 may determine the area 160 including the location of the terminal 82d, the terminal 82e, and the terminal 82f as the risk area.

The MEC server 60 combines the risk area information collected from each of the vehicles 20 with the area determined as a risk area by the MEC server 60 to identify the overall risk area within the information provision area 100. The MEC server 60 transmits to each of the vehicles 20 the information indicating the location of each risk area. The vehicle 20 uses an HMI function to notify the occupant of the vehicle 20 of the information indicating the risk area received from the MEC server 60. In addition, when the terminal 82 of the pedestrian 80 enters the risk area, the MEC server 60 transmits warning information to the terminal 82. For example, when the terminal 82a enters the risk area 120, the MEC server 60 transmits the warning information to the terminal 82a and uses the HMI function of the terminal 82a for the warning to the pedestrian 80. In addition, when the terminal 82a enters the risk area 120, the MEC server 60 transmits to the vehicle 20 the warning information indicating that a person is possibly present within the risk area 120.

It is noted that, when the vehicle 20 is present outside the information provision area 100, the information processing apparatus 24 detects an area which poses a risk for the vehicle 20 itself and transmits the warning information via direct communication to the terminal 82 which is present within the detected area.

According to the warning system 10, the MEC server 60 can collect risk area information from the vehicles 20 within the information provision area 100. The MEC server 60 can transmit warning information to the terminal 82 that has entered a risk area to notify the pedestrian 80 that he/she has entered an area that is difficult to be seen from the vehicle 20. In addition, the vehicle 20 can obtain the risk area information detected by another vehicle 20 from the MEC server 60. Thus, the risk area information that cannot be recognized by the own vehicle can be obtained from the MEC server 60. In addition, the vehicle 20d without a function to detect a risk area can also obtain risk area information from the MEC server 60, if it has a function to communicate with the MEC server 60. Thus, the traffic risk can be reduced.

According to the warning system 10, the vehicle 20 communicates the information related to an risk area with the MEC server 60 only when it is present within the information provision area 100, thus reducing an unnecessary communication with the MEC server 60. In addition, the vehicle 20 transmits only the information within the information provision area 100 to the MEC server 60, thus reducing the amount of data received/transmitted from/to the MEC server 60. In addition, the load to process the data that the information processing apparatus 24 receives from the MEC server 60 can be reduced.

It is noted that, for a clear description, the present embodiment describes a case in which a determination target related to the risk area is a pedestrian. The pedestrian refers to a person who can cross a road by means other than a vehicle. The pedestrian includes a person who crosses the road by means of a wheelchair and the like. However, the determination target related to the risk area may also include a person other than a pedestrian, or another moving object or vehicle. A person other than a pedestrian may include a person who is in a vehicle that is stopped. When the determination target related to the risk area is a vehicle, the terminal to which the warning information is transmitted from the MEC server 60 may be a communication apparatus such as a telematics control unit (TCU) included in another vehicle.

Figure 2:
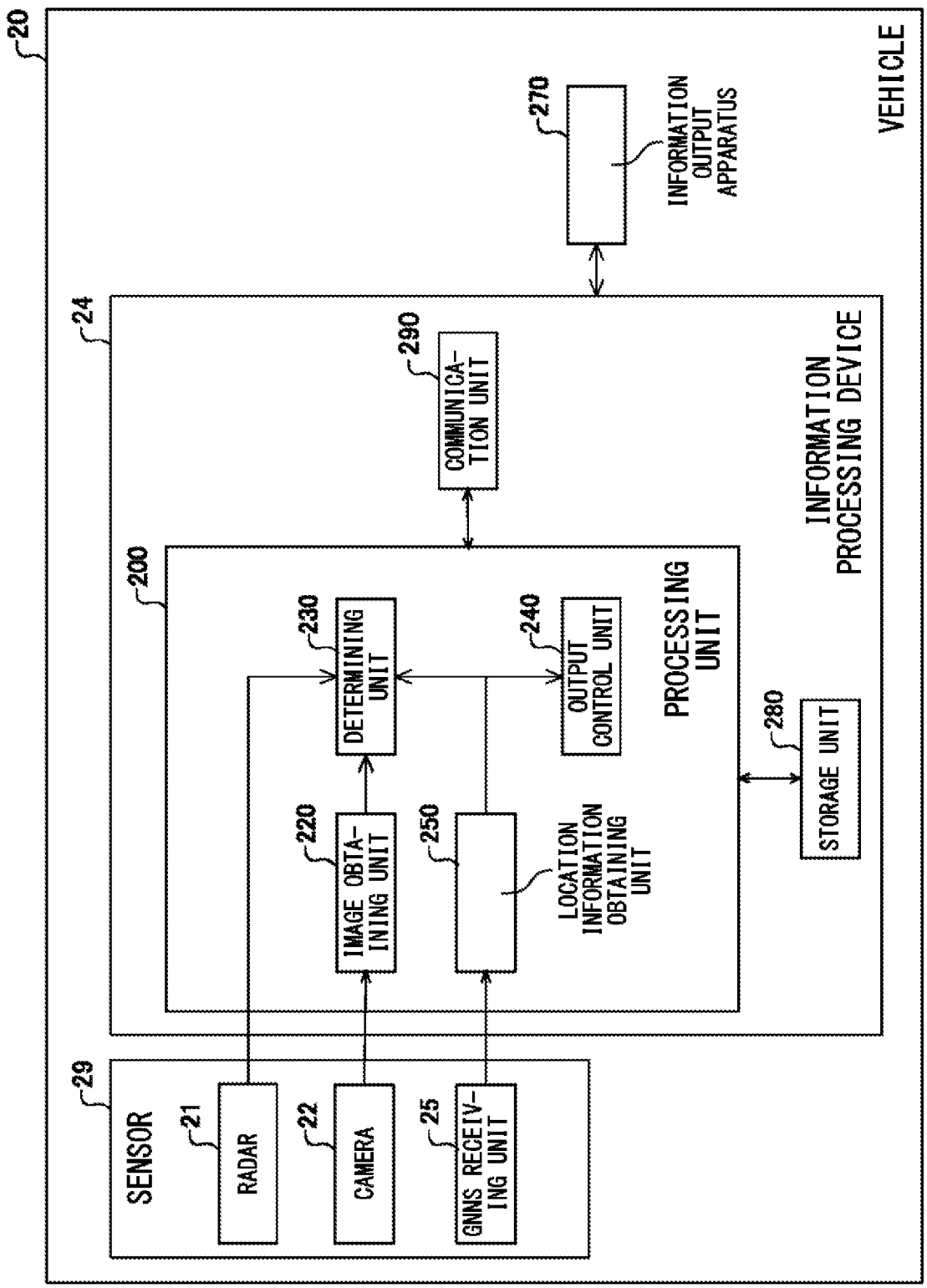
FIG. 2 is a diagram of a system configuration of a vehicle 20.

FIG. 2 is a system configuration of the vehicle 20. The vehicle 20 includes a sensor 29, an information processing apparatus 24, and an information output apparatus 270.

The sensor 29 includes a radar 21, a camera 22, and a GNSS receiving unit 25. The radar 21 may be an LiDAR, a millimeter-wave radar, or the like. The GNSS receiving unit 25 receives a radio wave transmitted from a Global Navigation Satellite system (GNSS) satellite. The GNSS receiving unit 25 generates the information indicating the current location of the vehicle 20 based on the signal received from the GNSS satellite. The camera 22 captures the image of the surroundings of the vehicle 20 to generate the image information. For example, the camera 22 captures the image ahead in the advancing direction of the vehicle 20, to generate the image information.

The information processing apparatus 24 includes a processing unit 200, a storage unit 280, and a communication unit 290. The processing unit 200 is implemented by an arithmetic processing device including a processor, for example. The storage unit 280 is implemented with a non-volatile storage media included. The processing unit 200 performs processing by using information stored in the storage unit 280. The communication unit 290 is responsible for direct communication with the information collecting apparatus 40. The processing unit 200 may be implemented by an Electronic Control Unit (ECU) including a microcomputer having a CPU, a ROM, a RAM, an I/O, a bus, and the like.

The information output apparatus 270 provides information to the occupant of the vehicle 20. The information output apparatus 270 may have a Human Machine Interface (HMI) function. The information output apparatus 270 may include a head-up display and a navigation system. The information output apparatus 270 may be a mobile terminal possessed by the occupant of the vehicle 20.

The processing unit 200 includes an image obtaining unit 220, a determining unit 230, a location information obtaining unit 250, and an output control unit 240. The image obtaining unit 220 obtains the image of the surroundings of the vehicle 20. The location information obtaining unit 250 obtains the location information of the vehicle 20. Specifically, the location information obtaining unit 250 obtains the location information of the vehicle 20 from the GNSS receiving unit 25.

The determining unit 230 determines a risk area based on the image obtained by the image obtaining unit 220. The communication unit 290 transmits the risk area information related to the risk area determined by the determining unit 230 to the information collecting apparatus 40 that collects information from the vehicles 20. The communication unit 290 transmits the risk area information to the information collecting apparatus 40 when the vehicle 20 is within a region where information is provided by the information collecting apparatus 40. The communication unit 290 transmits the risk area information to the information collecting apparatus 40 through direct communication with the information collecting apparatus 40.

It is noted that the determining unit 230 may determines, based on the location information obtained by the location information obtaining unit 250, whether the vehicle 20 is within a region where information is provided by the information collecting apparatus 40. For example, when the location indicated by the location information obtained by the location information obtaining unit 250 is included within the information provision area 100 of the information collecting apparatus 40, the determining unit 230 may determine that the vehicle 20 is within a region where information is provided by the information collecting apparatus 40. In addition, when receiving a wireless signal from the information collecting apparatus 40, the determining unit 230 may determine that the vehicle 20 is within a region where information is provided by the information collecting apparatus 40.

When the vehicle 20 is within a region where information is provided by the information collecting apparatus 40, the communication unit 290 transmits the risk area information including the location information of the risk area to the information collecting apparatus 40. When the vehicle 20 is within a region where information is provided by the information collecting apparatus 40, the communication unit 290 obtains, from the information collecting apparatus 40, the location information of the risk area related to the location information of the vehicle 20 among the information related to a plurality of risk areas collected by the information collecting apparatus 40. For example, the communication unit 290 may transmit the current location information of the vehicle 20 to the information collecting apparatus 40 and obtain, from the information collecting apparatus 40, the location information of the risk area ahead of the current location of the vehicle 20 on the advancing direction of the vehicle 20. The output control unit 240 causes the output of warning information for the occupant of the vehicle 20 based on the location information of the risk area obtained from the information collecting apparatus 40. For example, the output control unit 240 may cause the information output apparatus 270 to display the mark indicating the location of the risk area obtained from the information collecting apparatus 40.

When the vehicle 20 is not within a region where information is provided by the information collecting apparatus 40, the communication unit 290 transmits the warning information to the terminal within the risk area determined by the determining unit 230. Specifically, when the vehicle 20 is not within a region where information is provided by the information collecting apparatus 40, the determining unit 230 determines the area in which the pedestrian 80 who has a risk to be close to the vehicle 20 is present as a risk area, and transmits warning information to a terminal within the risk area. On the other hand, when the vehicle 20 is within a region where information is provided by the information collecting apparatus 40, the determining unit 230 determines the area that is difficult to be seen from the own vehicle and another vehicle as a risk area, and transmits the information related to the risk area determined by the determining unit 230 to the information collecting apparatus 40.

Figure 3:
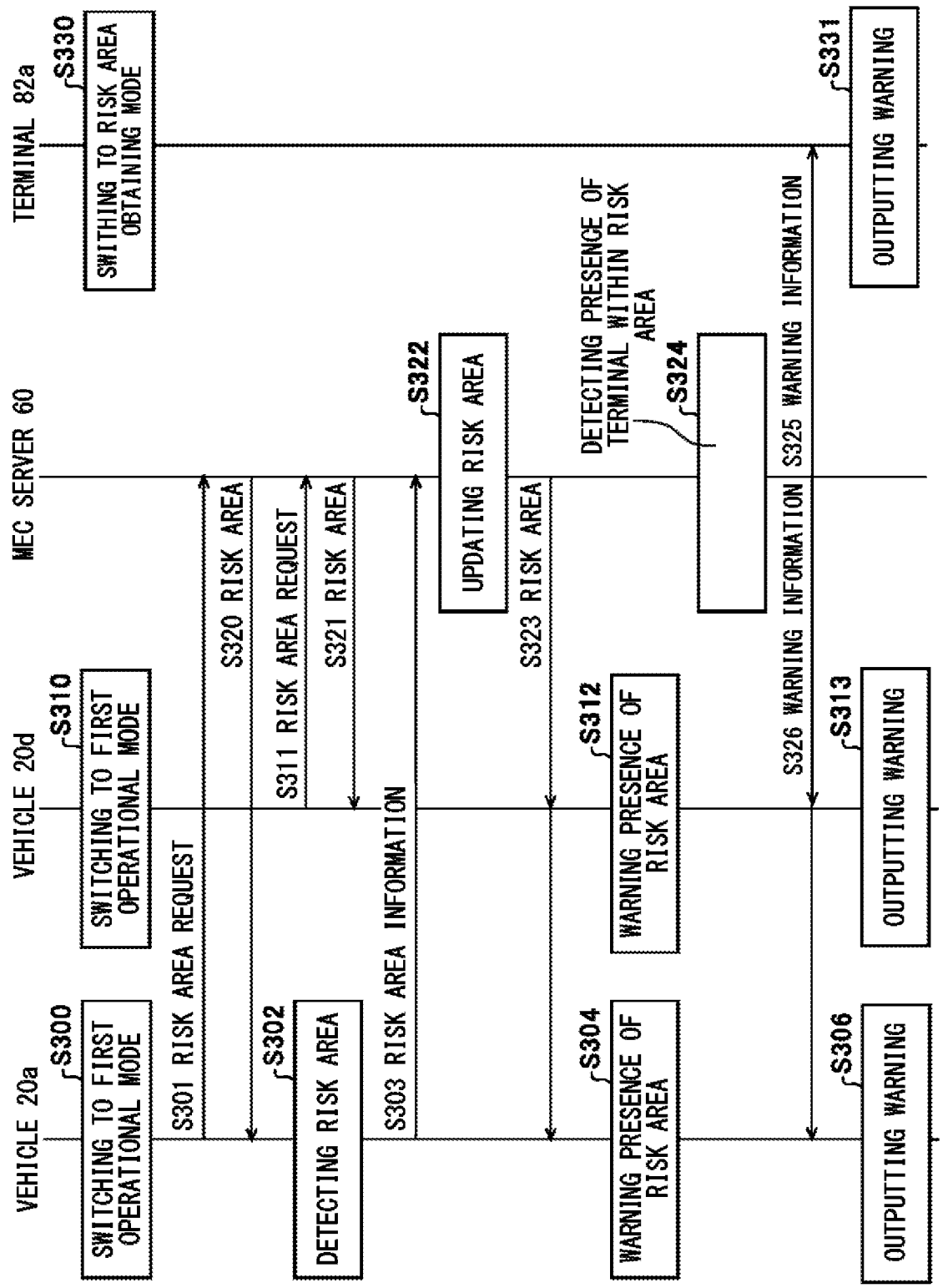

FIG. 3 is a schematic flow of a process performed by the vehicle 20, the MEC server 60, and the terminal 82*a*. Herein, the process flow is described using the vehicle 20*a*, the vehicle 20*d*, the MEC server 60, and the terminal 82*a*.

In S300, in response to the vehicle 20*a* entering the information provision area 100, the information processing apparatus 24*a* switches to a first operational mode. The first operational mode refers to the operational mode in which the information processing apparatus 24*a* transmits risk area information indicating the area determined as the risk area by the determining unit 230 to the MEC server 60 and receives the risk area information within the information provision area 100 from the MEC server 60. In the first operational mode, the information processing apparatus 24*a* periodically transmits the location information of the vehicle 20*a* to the MEC server 60.

In S301, the communication unit 290*a* of the vehicle 20*a* transmits a risk area request to the MEC server 60 to request the risk area. In S320, the MEC server 60 transmits the risk area information managed by the MEC server 60 to the vehicle 20*a*. The MEC server 60 may transmit to the vehicle 20*a* the risk area information of the risk area that is present on the advancing direction of the vehicle 20*a* among the risk area information managed by the MEC server 60.

For the vehicle 20*d*, in response to the vehicle 20*d* entering the information provision area 100 in S310, the information processing apparatus 24*d* switches to the first operational mode, as in the vehicle 20*a*. In the first operational mode, the information processing apparatus 24*d* periodically transmits the location information of the vehicle 20*d* to the MEC server 60. In S311, the communication unit 290*d* of the vehicle 20*d* transmits the risk area request to the MEC server 60 to request the risk area. In S321, the MEC server 60 transmits the risk area information managed by the MEC server 60 to the vehicle 20*d*. The MEC server 60 may transmit to the vehicle 20*d* the risk area information of the risk area that is present on the advancing direction of the vehicle 20*d* among the risk area information managed by the MEC server 60.

In S302, the determining unit 230*a* of the vehicle 20*a* determines a risk area based on the image obtained by the image obtaining unit 220*a*. For example, the determining unit 230*a* determines, as a risk area, an area adjacent to a stationary object that is present on the road ahead of the vehicle 20*a*. In addition, the determining unit 230*a* determines, as a risk area, an area in which the pedestrian 80 is present near a road, an area in which the pedestrian 80 walking toward a road is present, an area in which the pedestrian 80 is present on a road, an area in which the pedestrian 80 is present near a building, an area in which the pedestrians 80 walking in line are present, an area in which the pedestrians 80 including a child are present, an area in which the pedestrians 80 including an aged person are present, and an area in which another vehicle 20 running in an abnormal running state is present. For example, the abnormal running state includes a runaway state in which the vehicle is running with a speed exceeding a legal maximum speed, a reverse run state in which the vehicle is running in the opposite direction to the determined advancing direction on the road, and the like. In the first operational mode, the determining unit 230*a* also determines, as a risk area, an area that poses a risk for another vehicle or the pedestrian 80 who is far away, regardless of the risk for the vehicle 20*a*. In S303, the communication unit 290*a* transmits the risk area information including coordinate information of the risk area to the MEC server 60.

In S322, the MEC server 60 updates the risk area information managed by the MEC server 60 based on the risk area information received in S303. In S323, the MEC server 60 transmits the updated risk area information to the vehicle 20*a* and the vehicle 20*b*. The MEC server 60 may transmit all of the updated risk area information to the vehicle 20*a* and the vehicle 20*b*. The MEC server 60 may transmit only the updated risk area information to the vehicle 20*a* and the vehicle 20*b*.

In S304, when the information processing apparatus 24*a* of the vehicle 20*a* refers to the risk area information received from the MEC server 60 in S323 and recognized that the distance between the location of the vehicle 20*a* and the risk area is equal to or less than a predetermined distance, it warns that the vehicle 20*a* is close to the risk area. In S312, when the information processing apparatus 24*d* of the vehicle 20*d* refers to the risk area information received from the MEC server 60 in S323 and recognized that the distance between the location of the vehicle 20*d* and the risk area is equal to or less than a predetermined distance, it warns that the vehicle 20*d* is close to the risk area.

In S330, the terminal 82*a* switches the operational mode to the risk area obtaining mode when the location of the terminal 82*a* enters the information provision area 100. In the risk area obtaining mode, the terminal 82*a* periodically transmits the location information of the terminal 82*a* and the attribute data of the terminal 82*a* to the MEC server 60. For example, the attribute data includes necessity information indicating whether to request the protection of the pedestrian 80*a*. The terminal 82*a* may store the necessity information that is set by the owner of the terminal 82*a*. It is noted that, after referring to the necessity information, the MEC server 60 may transmit warning information when the protection of the pedestrian 80*a* is requested, or the MEC server 60 may not transmit warning information when the protection of the pedestrian 80*a* is not requested. It is noted that in the present embodiment it is supposed that the protection of the pedestrian 80*a* is requested.

In S324, when the MEC server 60 detects that the terminal 82*a* is present within the risk area 120 based on the location information that is periodically transmitted from the terminal 82*a* and the latest risk area information managed by the MEC server 60, it transmits warning information to the terminal 82*a* (S325). In addition, the MEC server 60 transmits the warning information including the location information of the risk area and the location information of the terminal 82*a* to the vehicle 20*a* and the vehicle 20*d* (S326). In S331, the terminal 82*a* uses the HMI function of the terminal 82*a* to output the warning to the pedestrian 80*a*. In addition, in S306, the output control unit 240*a* causes the information output apparatus 270*a* to output the warning information. In addition, in S313, the output control unit 240*b* causes the information output apparatus 270*b* to output the warning.

It is noted that when the MEC server 60 receives risk area information from one of the vehicles 20, it may request each of the vehicles 20 to obtain the image information of the risk area 120. In this case, upon receiving the image information of the risk area 120 from the vehicles 20, the MEC server 60 may determine whether a person is present within the risk area 120 by analyzing the image information, and transmit the warning information to the vehicle 20*a* and the vehicle 20*b* on the condition that a person is present within the risk area 120.

The MEC server 60 may broadcast the warning information to the vehicle 20*a* and the vehicle 20*b*. The MEC server 60 may select the vehicle 20 in the advancing direction of which the risk area 120 is present ahead based on the current location information received from the vehicle 20 and the location information of the risk area 120, and unicast the warning information to the selected vehicle 20.

In addition, the vehicle 20*a* may transmit the warning information to the terminal 82 within the risk area through direct communication, when the pedestrian 80 is present within the risk area determined by the determining unit 230*a* and the risk area indicated by the risk area information received by the MEC server 60.

FIG. 4 is one example of risk area information managed by the MEC server 60. The risk area information includes an ID, a determination source, an attribute, a risk area, and a receiving time. The "ID" refers to identification information of the source which has transmitted the data received by the MEC server 60. The "ID" may be the identification information which is allocated to each of the vehicle 20 and the terminal 82 by the information collecting apparatus 40 to communication with each of the vehicle 20 and the terminal 82.

The "determination source" refers to the type of apparatus that has determined the risk area. For example, the "determination source" includes the information that identifies the type of the determination source that has determined the risk area, such as an automobile or an MEC server. In the present embodiment, the determination source is either of "automobile" or "MEC". The "automobile" indicates that the risk area has been determined by the vehicle 20. The "MEC" indicates that the risk area has been determined by the MEC server 60.

The "attribute" refers to the attribute of the risk area. The attribute of the risk area is included in the risk area information and transmitted from the vehicle 20 to the MEC server 60. In the example of FIG. 4, "pedestrian", "out of visibility", and "pedestrian line" are exemplified as the "attribute". The "pedestrian" indicates an area in which the pedestrian 80 is present near the roadway. The "out of visibility" indicates an area with poor visibility for the vehicle 20 due to the vehicle 20 or the building 90. The "pedestrian line" indicates an area in which, for example, pedestrians 80 walking in line are present. The "attribute" may further include information such as a moving speed of the pedestrian, the moving direction of the pedestrian, the orientation of the pedestrian body, the orientation of the pedestrian face, the age group of the pedestrian (for example, a child, an aged person, or the like), whether the pedestrian is a handicapped person, or the like. The "attribute" may include a plurality of pieces of attribute data.

The "risk area" is the information indicating the location of the risk area. For example, the "risk area" may include the information indicating the coordinate of the center position of the risk area. The "risk area" may include the information indicating the center position and size of the risk area. The "risk area" may be any kind of information which can identify the range of the risk area. The "receiving time" is the time at which the risk area information is received.

The MEC server 60 updates the risk area information based on the information on the determination source, the attribute, and the receiving time. For example, the MEC server 60 may discard the risk area information when a predetermined time has elapsed since the receiving time. The time which elapses until the MEC server 60 discards the risk area information may be set for each attribute. For example, the time which elapses until the risk area information with the attribute of the "out of visibility" is discarded may be set to be longer by the MEC server 60 than the time which elapses until the risk area information with the attribute of the "pedestrian" is discarded. The time which elapses until the "automobile" discards the risk area information of the determination source may be set to be shorter by the MEC server 60 than the time which elapses until the "MEC" discards the risk area information of the determination source.

Figure 5:
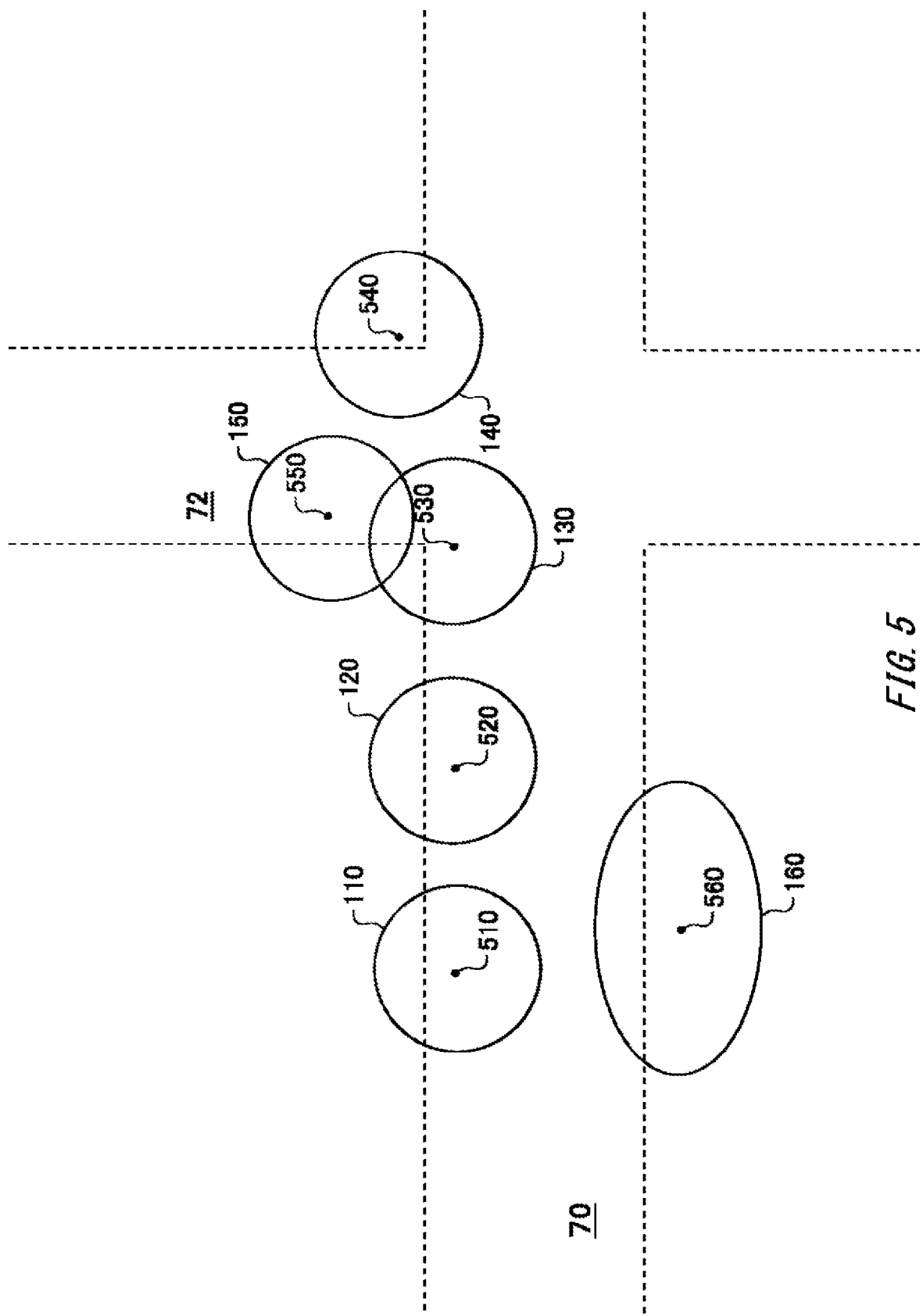
FIG. 5 is a conceptual diagram of a management method for a risk area managed by the MEC server 60.

FIG. 5 is a conceptual diagram of a management method for a risk area managed by the MEC server 60. The MEC server 60 manages the map information of the risk area determined by the vehicle 20 and the risk area determined by the MEC server 60 itself. As one example, the MEC server 60 may manage the risk area by using the center position of the risk area. For example, the MEC server 60 possesses risk area data including a geographic coordinate for each of a center position 510 of a risk area 110, a center position 520 of a risk area 120, a center position 530 of a risk area 130, a center position 540 of a risk area 140, a center position 550 of a risk area 150, and a center position 560 of a risk area 160. When the risk area has a circular shape, the risk area data may include the information on the diameter of the risk area. When the risk area has a polygonal shape, the risk area data may include the information on the length of the side such as width and height of the risk area. When the risk area has an ellipse shape, the risk area data may include the information on the center position, major axis, minor axis, and azimuth of the risk area. The shape of the risk area only has to be one or more closed regions, for example, may be a region which can be defined by coordinate information. When the MEC server 60 refers to the location information of the terminal 82 and the risk area data and determines that the terminal 82 is present within the risk area, it transmits the warning information to the terminal 82 and the vehicle 20. The MEC server 60 may refer to the history of the location information of the vehicle 20, identify the vehicle 20 running toward a risk area in which the pedestrian 80 is present, and transmit the warning information to the identified vehicle 20.

Figure 6:
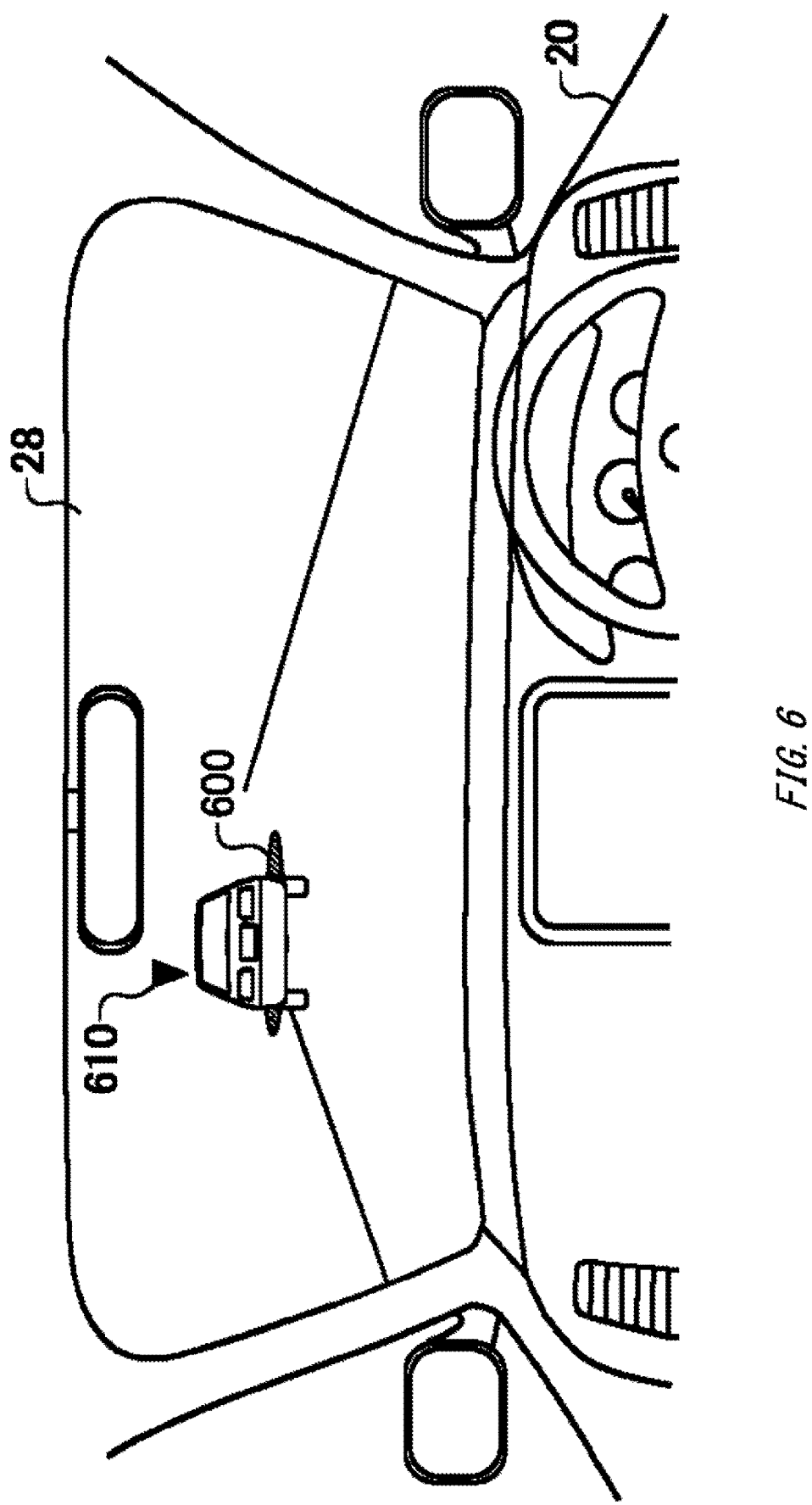
FIG. 6 is one example of a method for displaying warning information in the vehicle 20.

FIG. 6 is one example of a method for displaying the warning information in the vehicle 20. Herein, the information output apparatus 270 is described to include a head-up display. Upon receiving the warning information from the MEC server 60, the information output apparatus 270 projects light, which is used to form a mark 600 and a mark 610, to a reflection member installed on the wind shield 28 of the vehicle 20. The mark 600 is an object indicating a range of the risk area. The information output apparatus 270 determines the location to which the mark 600 is projected, based on the location information of the risk area included in the warning information. The mark 610 is an object indicating the presence of the pedestrian 80. The information output apparatus 270 controls the location to which the mark 610 is projected, based on the location information of the pedestrian 80 included in the warning information. It is noted that the information output apparatus 270 may output the warning information as voices or characters.

Figure 7:
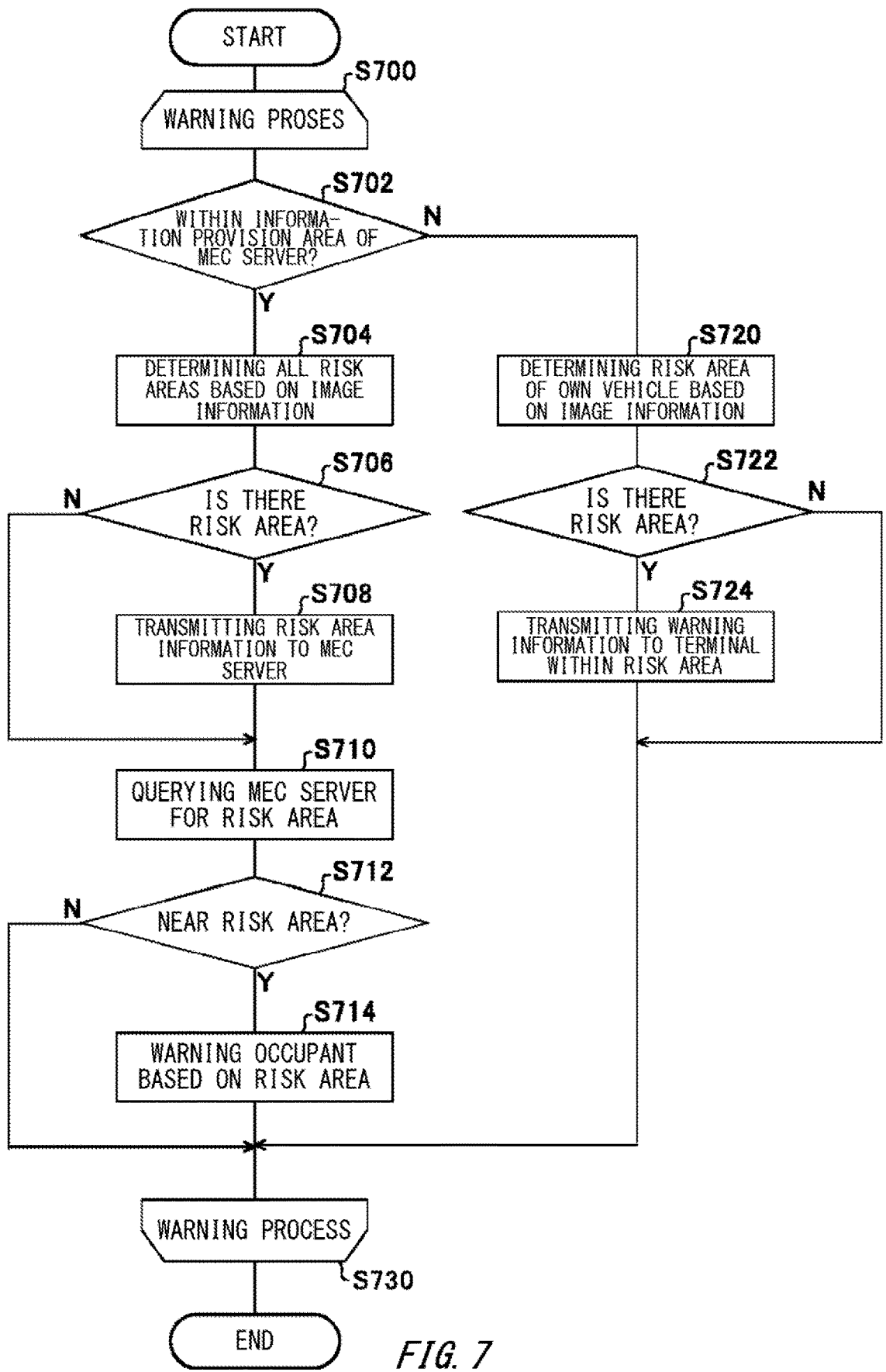
FIG. 7 is a flow chart according to the information processing method performed by an information processing apparatus 24.

FIG. 7 is a flow chart according to an information processing method performed by the information processing apparatus 24. The information processing apparatus 24 repeatedly performs the process from the start point S700 of the warning processing loop to the end point S730 of the warning processing loop. The information processing apparatus 24 ends the loop of the warning processing when a predetermined condition is met in at least one of the start point S700 of the warning processing and the end point S730 of the warning processing.

In S702, the determining unit 230 determines whether the vehicle 20 is present within the information provision area 100 of the MEC server 60. For example, the determining unit 230 may determine whether the vehicle 20 is present within the information provision area 100 based on the range information of the information provision area 100 stored in the storage unit 280 in advance and the current location information of the vehicle 20 obtained by the location information obtaining unit 250. The MEC server 60 may broadcast wireless signal including the range information of the information provision area 100 via the wireless access apparatus 50 and the determining unit 230 may determine whether the vehicle 20 is present within the information provision area 100 based on the range information of the information provision area 100 included in the wireless signal and the current location information. In this case, when the vehicle 20 enters the communication area 110, the determining unit 230 obtains the range information of the information provision area 100 from the wireless signal and determines whether the vehicle 20 is present within the information provision area 100. It is noted that, when the communication unit 290 receives the transmission request signal for the risk area information from the MEC server 60, the determining unit 230 may determine that the vehicle 20 is present within the information provision area 100. When the communication unit 290 receives any wireless signal transmitted from the wireless access apparatus 50, the determining unit 230 may determine that the vehicle 20 is present within the information provision area 100.

When the vehicle 20 is present within the information provision area 100, the information processing apparatus 24 operates with the first operational mode. In the first operational mode, the information processing apparatus 24 periodically transmits the location information of the vehicle 20. In addition, the information processing apparatus 24 determines all the risk areas within the information provision area 100. Specifically, in S704, the determining unit 230 determines all the risk areas which can be determined in the information provision area 100, based on the image information obtained by the image obtaining unit 220. For example, the determining unit 230 determines not only the risk area for the own vehicle, but also an area that may pose a risk for another vehicle as a risk area. For example, the determining unit 230 may determine, as a risk area, an area that is possibly difficult to be seen from any direction on the road due to a stationary object. In S706, the determining unit 230 determines whether there is any risk area. When there is a risk area, in S708, the communication unit 290 transmits the risk area information to the MEC server 60 and the process proceeds to S710. When there is no risk area, the process proceeds to S710 without S708 being performed. It is noted that, when there is no risk area, the communication unit 290 may transmit the information indicating that there is no risk area to the MEC server 60.

In S710, the communication unit 290 queries the MEC server 60 for the risk area. For example, the communication unit 290 transmits the request information for the risk area including the location information of the vehicle 20 to the MEC server 60. In S712, the output control unit 240 determines whether there is a risk area near the location of the vehicle 20 based on the risk area information received from the MEC server 60. When there is a risk area near the location of the vehicle 20, the output control unit 240 warns the occupant of the vehicle 20 based on the risk area (S714) and the process proceeds to S730. For example, the information output apparatus 270 may cause the HUD to display the mark 600 and the mark 610 indicating the location of the risk area, as shown in FIG. 6. When there is no risk area near the location of the vehicle 20, the process proceeds to S730 without any warning. It is noted that the process in S710 may be performed on the condition that the advancing direction of the vehicle 20 changes after right turning, left turning, or the like. If the advancing direction of the vehicle 20 does not change, the process in S710 may be performed each time the vehicle 20 runs a predetermined distance.

In the determination at S702, if it is determined that the vehicle 20 is not present within the information provision area 100 of the MEC server 60, the information processing apparatus 24 operates with a second operational mode. Specifically, in S720, the determining unit 230 determines the risk area for the own vehicle, based on the image information obtained by the image obtaining unit 220. For example, the determining unit 230 determines an area in which the pedestrian who will possibly be close to the own vehicle is present as a risk area. Specifically, the determining unit 230 detects the current location of the pedestrian based on the distance measurement information obtained by the radar 21 and the current location information of the vehicle 20. The determining unit 230 identifies the moving direction of the pedestrian or the like by identifying the orientation of the pedestrian through image recognition. The determining unit 230 identifies the pedestrian who has a risk to be close to the vehicle, in particular, the pedestrian who will possibly be present on the predicted path along which the vehicle 20 will run, based on the current location and moving direction of the pedestrian. The determining unit 230 determines an area in which the identified pedestrian is present as a risk area.

In S722, the determining unit 230 determines whether there is any risk area. When there is a risk area, in S724, the communication unit 290 transmits the warning information to the terminal 82 within the risk area, and the process proceeds to S730. When it is determined that there is no risk area in S722, the process proceeds to S730 without S724 being performed. It is noted that, in S724, the communication unit 290 may broadcast the warning information including the location information of the risk area. The terminal 82 that has received the warning information from the communication unit 290 warns using the HMI function of the terminal 82 when the current location of the own vehicle is present within the risk area.

According to the warning system 10 as described above, when the vehicle 20 enters the information provision area 100 of the MEC server 60, it switches from the second operational mode to the first operational mode, determines not only the risk area for the own vehicle but also an area that will possibly be the risk area for another vehicle, and transmits the result to the MEC server 60. Thus, the risk area information can be mutually shared among the vehicles 20. In addition, the MEC server 60 can transmit the warning information to the terminal 82 that has entered the risk area detected by the each of the vehicles 20. Thereby, the traffic safety can be improved. In addition, the vehicle 20 communicates the information related to a risk area with the MEC server 60 only when it is present within the information provision area 100, thus avoiding an unnecessary communication with the MEC server 60. Thereby, the volume of communication traffic with the MEC server 60 can be reduced. In addition, the load for processing the data received by the information processing apparatus 24 from the MEC server 60 can be reduced.

It is noted that, in the description above, the implementation has been described where the information processing apparatus 24 communicates with the information collecting apparatus 40 including the wireless access apparatus 50 and the MEC server 60. The communication manner between the information processing apparatus 24 and the information collecting apparatus 40 is not limited thereto. The information processing apparatus 24 may perform direct communication with the information collecting apparatus 40 through the short distance direct communication in Cellular-V2X. The short distance direct communication in Cellular-V2X includes a communication manner such as LTE-V2X PC5 or 5G-V2X PC5. The direct communication between the information processing apparatus 24 and the information collecting apparatus 40 may employ the form that uses Wi-Fi (RT), and Dedicated Short Range Communications (DSRC) (registered trademark). For the direct communication between the information processing apparatus 24 and the information collecting apparatus 40, any direct communication manner such as Bluetooth (registered trademark) other than Cellular-V2X or DSRC (registered trademark) may be employed. The information processing apparatus 24 may perform direct communication with the information collecting apparatus 40 using communication infrastructure included in the Intelligent Transport Systems (ITS).

It is noted that the information processing apparatus 24 may also determine an area in which the own vehicle is predicted to pose a risk as a risk area and transmit the risk area information to the MEC server 60. For example, when the speed of the vehicle 20a exceeds a predetermined reference value, the determining unit 230a may determine the place to which the vehicle 20a is advancing as a risk area. For example, when the traffic light in the place to which the vehicle 20a is advancing displays a signal of prohibiting the advance and the speed of the vehicle 20a exceeds a predetermined reference value, the determining unit 230a may determine the area to which the vehicle 20a is advancing as a risk area. When the determining unit 230a determines that the automatic control of the vehicle 20a is required using the Advanced Driver-Assistance Systems (ADAS) included in the vehicle 20a, it may determine the area to which the vehicle 20a is advancing as a risk area. In addition, the MEC server 60 may identify the risk area based on the image information obtained by the camera provided on the infrastructure such as the camera provided on the traffic light. When the traffic light displays the signal of prohibiting the advance and the speed of the vehicle exceeds a predetermined reference value, the MEC server 60 may determine the area to which the vehicle is advancing as the risk area. The MEC server 60 may determine the risk area based on the learned data that is obtained through the learning that uses location information collected by the terminal 82 in the past and the location information, risk area information, accident information and the like collected from the vehicle 20 in the past, and the current location information collected from the terminal 82 and the location information and the risk area information collected from the vehicle 20.

It is noted that the vehicle 20 is one example of transportation equipment. The transportation equipment includes, for example, an automobile such as a passenger vehicle or a bus, a saddle-ride type vehicle, and a bicycle. Moreover, the moving object includes not only a person but also transportation equipment, for example, an automobile such as a passenger vehicle or a bus, a saddle-ride type vehicle, and a bicycle.

Figure 8:
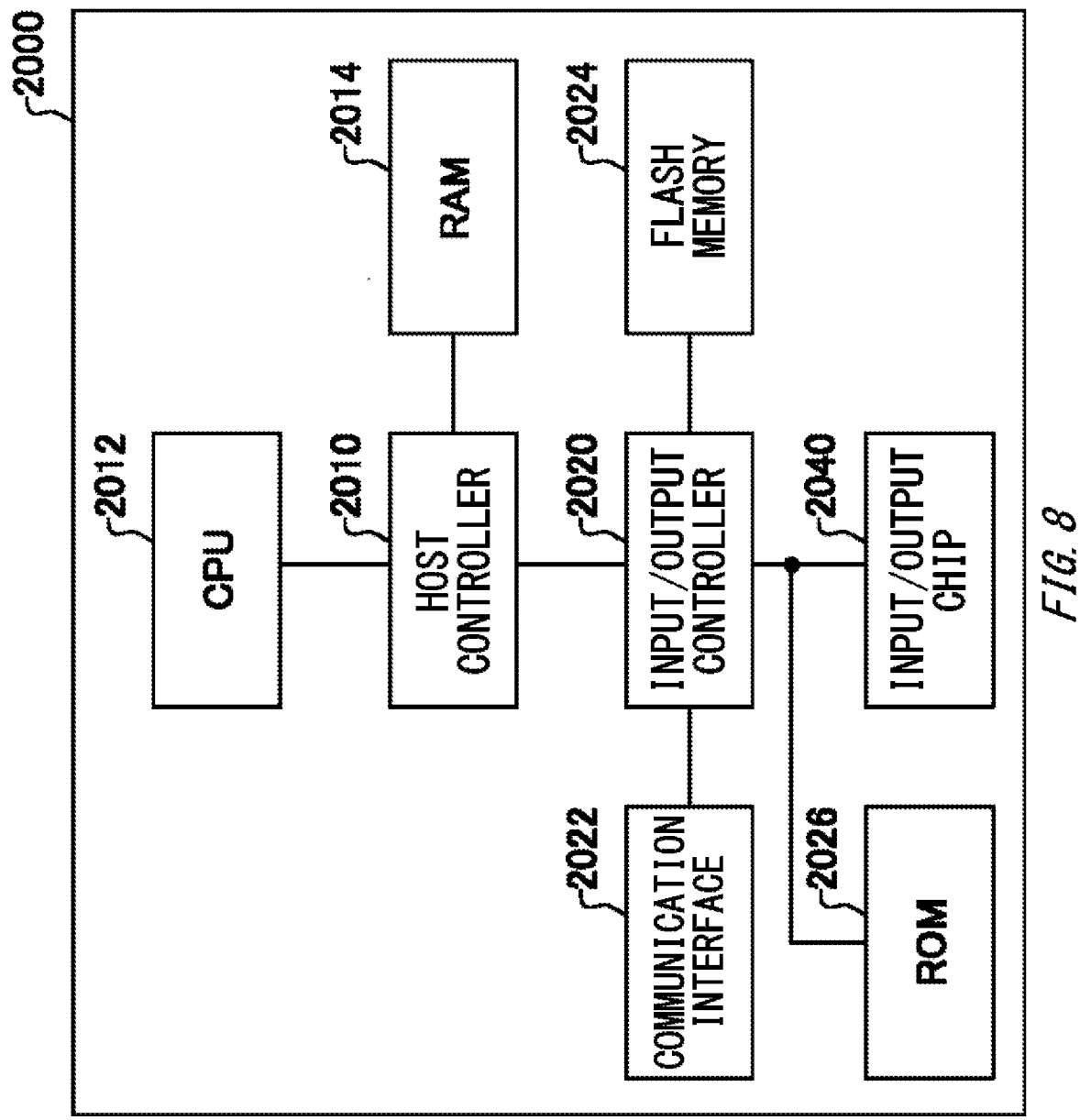
FIG. 8 is an example of a computer 2000.

FIG. 8 shows an example of a computer 2000 where a plurality of embodiments of the present invention may be entirely or partially embodied. The program installed on the computer 2000 can cause the computer 2000 to serve as a device such as the information processing apparatus 24 according to the embodiment or each unit of the device, perform an operation associated with the device or each unit of the device, and/or perform a process according to the embodiment or steps of the process. Such a program may be executed by a CPU 2012 in order to cause the computer 2000 to execute a specific operation associated with some or all of the blocks in the process procedure and the block diagram described in the specification.

The computer 2000 according to this embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

The program is provided via a network or a computer-readable medium such as a CD-ROM, a DVD-ROM, or a memory card. The RAM 2014, the ROM 2026, or the flash memory 2024 is an example of the computer-readable medium. The program is installed in the flash memory 2024, the RAM 2014 or the ROM 2026 and executed by the CPU 2012. Information processing described in the program is read by the computer 2000, thereby resulting in cooperation between the program and above-described various types of hardware resources. A device or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing on based on the processes written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium.

Also, the CPU 2012 may cause all or required portions of a file or a database stored in the recording medium such as the flash memory 2024 to be read by the RAM 2014, and perform various kinds of processes on the data on the RAM 2014. The CPU 2012, then, writes back the processed data into the recording medium.

Various types of programs and various types of information such as data, tables, and databases may be stored in the recording medium, and they may be performed information processing. The CPU 2012 may perform, on the data read from the RAM 2014, various kinds of processing including various kinds of operations, information processing, conditional judgments, conditional branching, unconditional branching, information searching/replacing and the like described in the specification and specified by an instruction sequence of the program, and writes back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The program or software module described above may be stored on the computer 2000 or in a computer-readable medium near the computer 2000. The recording medium such as a hard disk or RAM provided in a server system connected to a dedicated communication network or the internet is available as a computer-readable medium. The program stored in the computer-readable medium may be provided to the computer 2000 via the network.

The program installed in the computer 2000 and causing the computer 2000 to function as the information processing apparatus 24 may instruct the CPU 2012 or the like to cause the computer 2000 to function as each unit of the information processing apparatus 24. The information processing written in these programs are read by the computer 2000 to cause the computer to function as each unit of the information processing apparatus 24, which is a specific means realized by the cooperation of software and the various types of hardware resources described above. Then, these specific means implement operations or processing of information corresponding to the intended use of the computer 2000 in this embodiment, so that the information processing apparatus 24 is constructed as a specific information processing apparatus corresponding to the intended use.

A variety of embodiments have been described with reference to the block diagram and the like. In the block diagram, each block may represent (1) a step of a process in which an operation is performed, or (2) each unit of the device having a role of performing the operation. Specific steps and each unit may be implemented by a dedicated circuit, a programmable circuit provided along with a computer-readable instruction stored on a computer-readable medium, and/or a processor provided along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operation; and a memory element such as a flip-flop, a register, a field programmable gate array (FPGA), a programmable logic array (PLA); and so on.

The computer-readable medium may include any tangible device capable of storing an instruction executed by an appropriate device, so that the computer-readable medium having the instruction stored thereon constitutes at least a part of a product including the instruction that may be executed in order to result in a means for executing an operation specified by a processing procedure or a block diagram. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk, JAVA (registered trademark), C++, etc., and conventional procedural programming languages, such as the "C" programming language or similar programming languages. Computer-readable instructions may be provided to a general-purpose computer, a special-purpose computer, or a processor or a programmable circuit of other programmable data processing device, locally or via a local area network (LAN), a wide area network (WAN) such as the internet, and computer-readable instructions may be executed in order to result in a means for executing operations specified by the described processing procedure or the block diagram. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 warning system
20 vehicle
21 radar
22 camera 24 information processing apparatus
25 GNSS receiving unit
28 wind shield
29 sensor
40 information collecting apparatus
50 wireless access apparatus
52 dedicated line
60 MEC server
70, 72 road
80 pedestrian
82 terminal
90 building
100 information provision area
110, 120, 130, 140 area
200 processing unit
220 image obtaining unit
230 determining unit
240 output control unit
250 location information obtaining unit
270 information output apparatus
280 storage unit
290 communication unit
510, 520, 530, 540 center position
600, 610 mark
2000 computer
2010 host controller
2012 CPU
2014 RAM
2020 input/output controller
2022 communication interface
2024 flash memory
2026 ROM
2040 input/output chip

What is claimed is:

1. An information processing apparatus comprising:
an image obtaining unit for obtaining an image around a moving object;
a determining unit for determining a risk area based on the image obtained by the image obtaining unit; and
a communication unit for transmitting risk area information related to the risk area determined by the determining unit to an information collecting apparatus which is configured to collect risk area information from a plurality of moving objects,
wherein
when the moving object is not within a region where information is provided by the information collecting apparatus, the determining unit determines, as the risk area, an area where an object that has a risk to be close to the moving object is present, and the communication unit transmits warning information to a terminal within the risk area determined by the determining unit through direct communication with the terminal within the risk area determined by the determining unit; and
when the moving object is within the region where information is provided by the information collecting apparatus, the communication unit transmits the risk area information to only the information collecting apparatus through direct communication with the information collecting apparatus.

2. The information processing apparatus according to claim 1, wherein the communication unit transmits, to the information collecting apparatus, the risk area information including location information of the risk area when the moving object is within a region where information is provided by the information collecting apparatus.

3. The information processing apparatus according to claim 2, wherein the communication unit obtains, from the information collecting apparatus, location information of a risk area related to location information of the moving object among information related to a plurality of risk areas collected by the information collecting apparatus when the moving object is within a region where information is provided by the information collecting apparatus.

4. The information processing apparatus according to claim 3, further comprising an output control unit for causing warning information to be output to an occupant of the moving object based on location information of the risk area obtained from the information collecting apparatus.

5. The information processing apparatus according to claim 1, wherein
the information collecting apparatus includes a wireless access apparatus and a processing unit which is connected to the wireless access apparatus via a dedicated line, and
the communication unit transmits the risk area information to the processing unit when the moving object is within a region where wireless communication with the wireless access apparatus is possible.

6. The information processing apparatus according to claim 1, wherein the information collecting apparatus includes a mobile edge computing (MEC) server.

7. The information processing apparatus according to claim 1, wherein the moving object is a vehicle.

8. A vehicle comprising the information processing apparatus according to claim 7.

9. A non-transitory computer-readable storage medium that stores a program that causes a computer to function as:
an image obtaining unit for obtaining an image around a moving object;
a determining unit for determining a risk area based on the image obtained by the image obtaining unit; and
a communication unit for transmitting risk area information related to the risk area determined by the determining unit to an information collecting apparatus which is configure to collect information from a plurality of moving objects,
wherein
when the moving object is not within a region where information is provided by the information collecting apparatus, the determining unit determines, as the risk area, an area where an object that has a risk to be close to the moving object is present, and the communication unit transmits warning information to a terminal within the risk area determined by the determining unit through direct communication with the terminal within the risk area determined by the determining unit; and
when the moving object is within the region where information is provided by the information collecting apparatus, the communication unit transmits the risk area information to only the information collecting apparatus through direct communication with the information collecting apparatus.

10. An information processing method comprising:
an image obtaining step to obtain an image around a moving object;
a determining step to determine a risk area based on the image that is obtained in the image obtaining step; and
a communication step to transmit risk area information related to the risk area determined in the determining step to an information collecting apparatus which is configured to collect information from a plurality of moving objects, wherein when the moving object is not within a region where information is provided by the information collecting apparatus, the determining step includes determining, as the risk area, an area where an object that has a risk to be close to the moving object is present, and the communication step includes transmitting warning information to a terminal within the risk area determined by the determining step through direct communication with the terminal within the risk area determined by the determining step; and when the moving object is within the region where information is provided by the information collecting apparatus, the communication step includes transmitting the risk area information to only the information collecting apparatus through direct communication with the information collecting apparatus.

\* \* \* \* \*